(12) United States Patent
Dabiri et al.

(10) Patent No.: US 8,248,170 B2
(45) Date of Patent: Aug. 21, 2012

(54) STABILIZED DIGITAL QUADRATURE OSCILLATOR

(75) Inventors: Dariush Dabiri, San Jose, CA (US);
Dongwoon Bai, Sunnyvale, CA (US);
Nils Graef, Sunnyvale, CA (US);
Wenwei Pan, Irvine, CA (US)

(73) Assignee: Applied Micro Circuit Corporation, San Diego, CA (US)

( * ) Notice: Subject to any disclaimer, the term of this patent is extended or adjusted under 35 U.S.C. 154(b) by 0 days.

(21) Appl. No.: 12/952,154

(22) Filed: Nov. 22, 2010

(65) Prior Publication Data

US 2012/0126903 A1    May 24, 2012

(51) Int. Cl.
*H03K 3/03* (2006.01)
(52) U.S. Cl. ............. 331/57; 301/45; 327/156; 327/159
(58) Field of Classification Search .................... 331/45, 331/57; 327/156, 159
See application file for complete search history.

(56) References Cited

U.S. PATENT DOCUMENTS 7,741,921 B2 * 6/2010 Ismailov .................. 331/55

* cited by examiner

*Primary Examiner* — Arnold Kinkead
(74) *Attorney, Agent, or Firm* — Silicon Valley Patent Group, LLP; Edward S. Mao

(57) ABSTRACT

A stabilized quadrature oscillator providing consistently high signal quality is disclosed. The stabilized quadrature oscillator includes an iterative quadrature oscillator and a quadrature signal stabilizer. The iterative quadrature oscillator generates an iterative cosine signal and an iterative sine signal using a stabilized cosine signal and a stabilized sine signal from the quadrature signal stabilizer. The quadrature signal stabilizer generates the stabilized cosine signal and the stabilized sine signal based on an energy measure of the iterative cosine signal and the iterative sine signal. Specifically, if the energy measure is less than a low threshold then the quadrature signal stabilizer generates the stabilized sine signal and the stabilized cosine signal to have a greater magnitude than the iterative sine signal and the iterative cosine signal, respectively. Conversely, if the energy measure is greater than a high threshold then the quadrature signal stabilizer generates the stabilized sine signal and the stabilized cosine signal to have a lesser magnitude than the iterative sine signal and the iterative cosine signal, respectively.

24 Claims, 12 Drawing Sheets

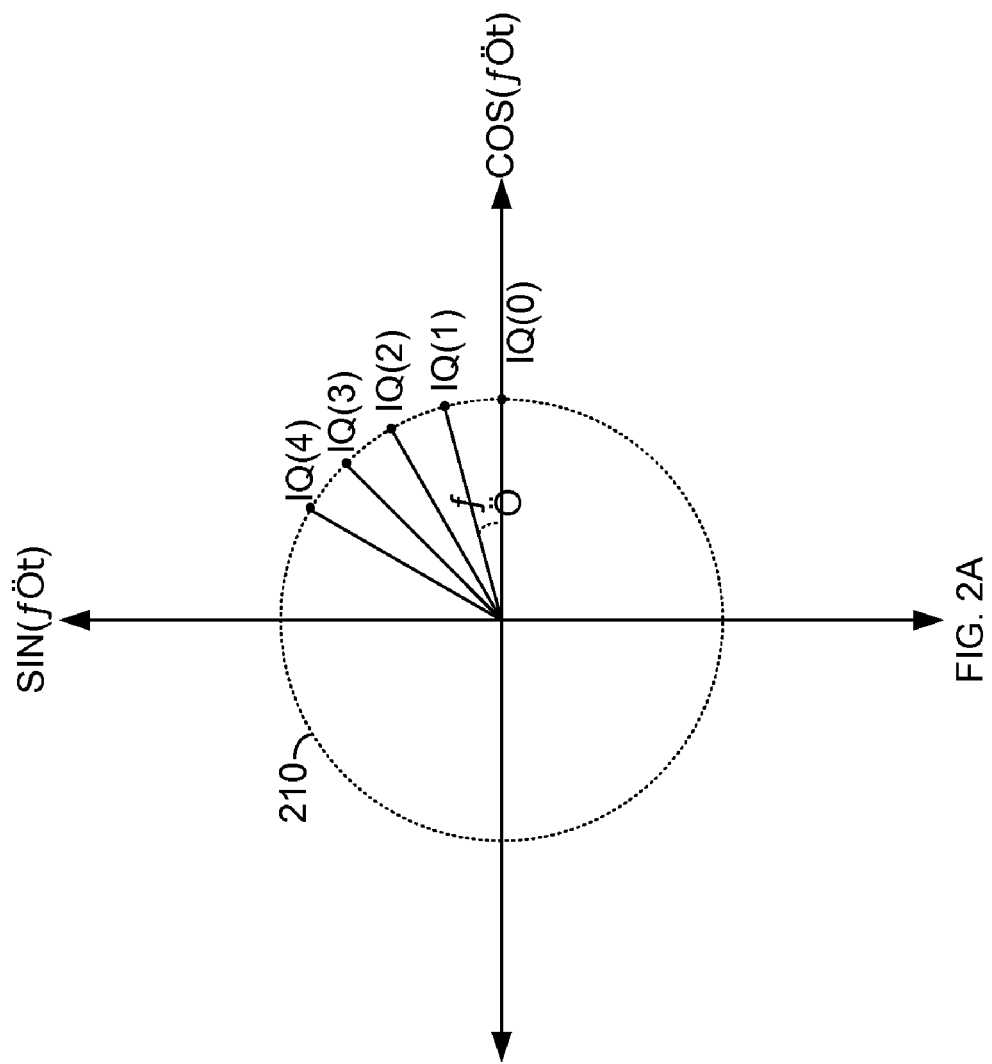

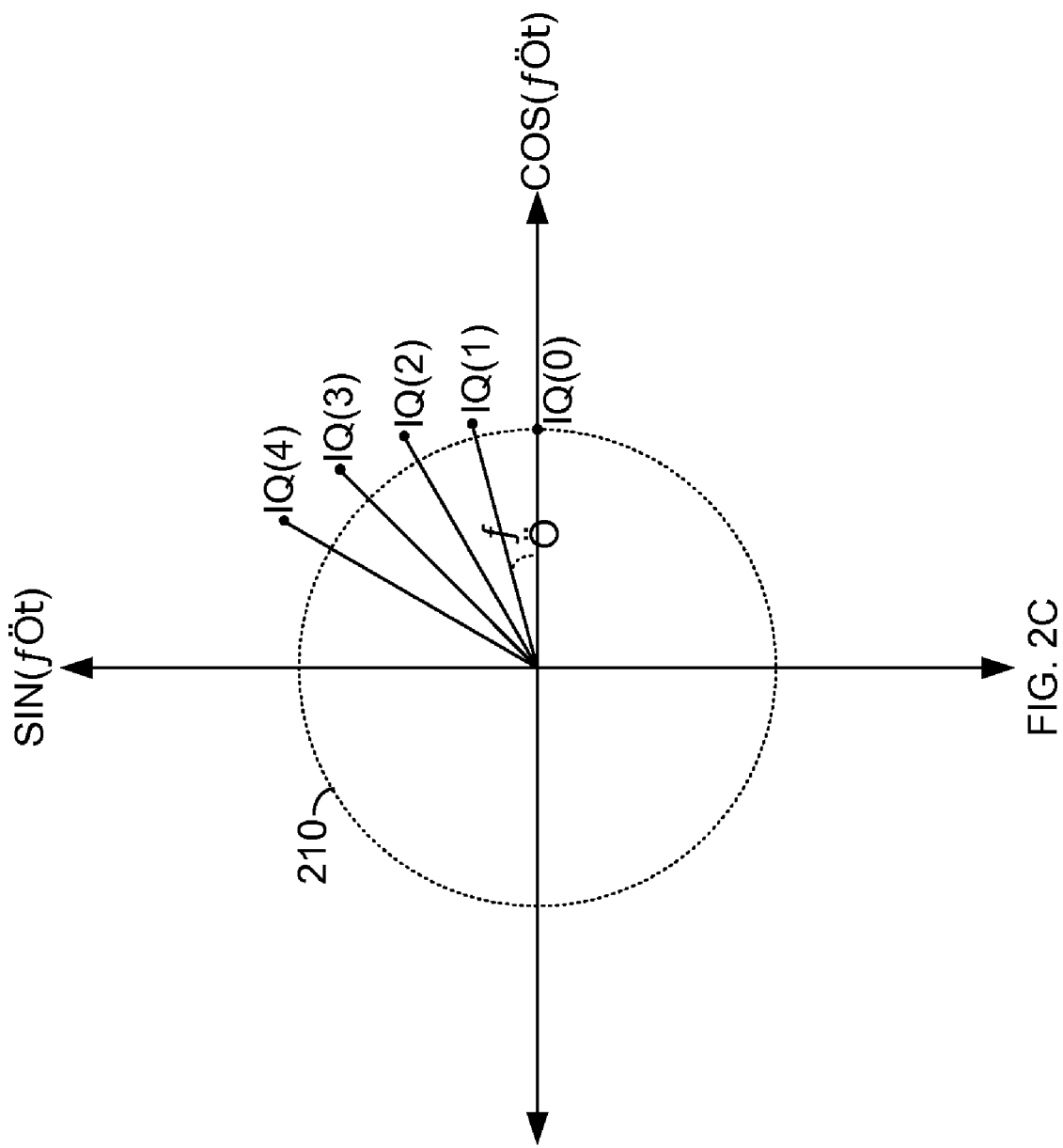

STABILIZED DIGITAL QUADRATURE OSCILLATOR

CROSS-REFERENCE TO RELATED APPLICATIONS

This patent application is related to and incorporates by reference herein in their entirety, the following patent applications that are co-owned and concurrently filed herewith:
(1) US patent application, entitled "Multi-Input IIR Filter with Error Feedback" by Maged F. Barsoum et al., (U.S. application Ser. No. 12/952,193);
(2) US patent application, entitled "Detection and Estimation of Narrowband Interference By Matrix Multiplication" by Dariush Dabiri, (U.S. application Ser. No. 12/952,164);
(3) US patent application, entitled "Confirmation of Presence of Narrowband Interference By Harmonic Analysis" by Dariush Dabiri et al., (U.S. application Ser. No. 12/952,172);
(4) US patent application, entitled "Adaptive Spectral Enhancement and Harmonic Separation" by Dariush Dabiri et al., (U.S. application Ser. No. 12/952,184);
(5) US patent application, entitled "Adaptive Narrowband Interference Prediction Circuit and Method" by Dariush Dabiri et al., (U.S. application Ser. No. 12/952,184); and
(6) US patent application, entitled "Narrowband Interference Cancellation Method and Circuit" by Dariush Dabiri, (U.S. application Ser. No. 12/952,150).

BACKGROUND

1. Background Field

The present invention relates to signal processing systems.

2. Relevant Background

Many signal processing applications, such as notch filters, transmission of two signals on a single carrier, and frequency conversion, require a pair of quadrature signals. Specifically, Quadrature signals (i.e. signals having a quadrature relationship) are two signal that are generated with a 90 degree phase difference. One of the most commonly used quadrature signal pairs in signal processing applications are a sine signal SIN($\omega$t) and a cosine signal COS($\omega$t).

One process to generate quadrature sine signals and cosine signals is to begin with an initial value at time t=0, such that SIN($\omega$t)=SIN(0)=1 and COS($\omega$t)=COS(0)=0 and then generate each successive value of the quadrature signals iteratively. FIG. 1 shows an iterative quadrature oscillator 110, which receives a sine parameter SIN($\omega$) and a cosine parameter COS($\omega$) and generates a sine signal SIN($\omega$t) and a cosine signal COS($\omega$t), which are also fed back into iterative quadrature oscillator 110 for iterative processing.

Specifically, a rotation matrix can be used to generate sine signal SIN($\omega$t) and cosine signal COS($\omega$t) from sine signal SIN($\omega$(t-1)) and cosine signal COS($\omega$(t-1)). In equation EQ1, we define a iterative quadrature vector IQ(t).

$$IQ(t) = \begin{bmatrix} COS(\omega t) \\ SIN(\omega t) \end{bmatrix} \quad (EQ1)$$

As explained above, iterative quadrature vector IQ(t) (i.e. at time t) is generated using a rotation matrix [R] and previous value of the iterative quadrature vector, i.e. IQ(t-1)). Specifically, as shown in Equation EQ2, iterative quadrature vector IQ(t) is equal to rotation matrix [R($\omega$)] multiplied by iterative quadrature vector IQ(t-1) (i.e. the value at time t-1.

$$IQ(t)=[R(\omega)]*IQ(t-1) \quad (EQ2)$$

Rotation matrix [R($\omega$)] rotates vector (IQ(t-1) by $\omega$ radians (or degrees). Equation EQ3 represents equation EQ2 using the actual SIN and COS values and parameters.

$$\begin{bmatrix} COS(\omega t) \\ SIN(\omega t) \end{bmatrix} = \begin{bmatrix} COS(\omega) & -SIN(\omega) \\ SIN(\omega) & COS(\omega) \end{bmatrix} * \begin{bmatrix} COS(\omega(t-1)) \\ SIN(\omega(t-1)) \end{bmatrix} \quad (EQ3)$$

Equation EQ3 can be used to generate separate equations for cosine signal COS($\omega$t) and sine signal SIN($\omega$t). Specifically, cosine signal COS($\omega$t) is equal to cosine parameter COS($\omega$) multiplied by cosine signal COS($\omega$(t-1)) plus the product of sine parameter SIN($\omega$) with sine signal SIN($\omega$(t-1)). This relationship is set out mathematically in equation EQ4. Similarly, sine signal SIN($\omega$t) is equal to negative sine parameter SIN($\omega$) multiplied by cosine signal COS($\omega$(t-1)) plus the product of cosine parameter COS($\omega$) with sine signal SIN($\omega$(t-1)). This relationship is set out mathematically in equation EQ5.

$$COS(\omega t)=[COS(\omega)*COS(\omega(t-1))]+[-SIN(\omega)*SIN(\omega(t-1))] \quad (EQ4)$$

$$SIN(\omega t)=[SIN(\omega)*COS(\omega(t-1))]+[COS(\omega)*SIN(\omega(t-1))] \quad (EQ5)$$

Equations EQ4 and EQ5 can also be derived using well known trigonometry formulas for COS(A+B) and SIN(A+B), where A is $\omega$ and B is (t-1)$\omega$.

FIG. 2A illustrates the principles of equation EQ3. Specifically, in FIG. 2A, sine signal SIN($\omega$t) is graphed on the vertical axis and cosine signal COS($\omega$t) is graphed on the horizontal axis. Iterative quadrature vector IQ(t) for time t equal to 0, 1, 2, 3, and 4 are shown in FIG. 2A. Specifically, at time t=0, iterative quadrature vector IQ(0) has a value of (1, 0). At time t=1, iterative quadrature vector IQ(1) is equal to iterative quadrature vector IQ(0) rotated by $\omega$ radians. Thus, iterative quadrature vector IQ(1) has a value of (COS($\omega$), SIN(2$\omega$)). Similarly, at t=2 iterative quadrature vector IQ[2] is equal to iterative quadrature vector IQ(1) rotated by $\omega$ radians. Thus, iterative quadrature vector IQ(2) has a value of (COS(2$\omega$), SIN(2$\omega$)). In the same manner, iterative quadrature vector IQ[3] and IQ[4] is equal to (COS(3$\omega$), SIN(3$\omega$)) and (COS(4$\omega$), SIN(4$\omega$)), respectively. Thus, in general, iterative quadrature vector IQ[t] is equal to (COS($\omega$t), SIN($\omega$t)).

FIG. 2A is an idealized representation in which iterative quadrature vector IQ[t] remains on unit circle 210 (i.e. a circle with a radius of 1). However, for actual implementations of an iterative quadrature oscillators, especially digital implementations, iterative quadrature vector IQ(t) will tend to drift away from unit circle 210 over many iterations. A primary reason for the drifting in digital implementations of iterative quadrature oscillator is that sine and cosine values include irrational numbers, which can not be represented precisely using binary numbers. Thus, the rounding or truncation of the values at each iteration leads to instability of the iterative quadrature oscillator.

FIG. 2B illustrates an inward drifting, thus each successive iterative quadrature vector IQ(t) gets smaller. The inward drifting is likely caused by truncation errors in the binary representations of cosine signal COS($\omega$t) and sine signal SIN($\omega$t) which causes the sum of their energies in the binary representation to be less than the actual values. The errors are likely to compound over many iterations and eventually lead to unusable results.

FIG. 2C illustrates an outward drifting, thus for each successive iterative quadrature vector IQ(t) gets larger. The outward drifting is likely caused by rounding errors in the binary representations of cosine signal COS(ωt) and sine signal SIN (ωt) which causes the sum of their energies in the binary representation to be greater than the actual values. The errors are likely to compound over many iterations and eventually lead to unusable results.

One method to correct to the drifting issue is to periodically reset the iterative quadrature oscillator for values of ωt, in which cosine signal COS(ωt) and sine signal SIN(ωt) are at known rational values. For example, when ωt is equal to 0, π/2, π, and 3π/2, then cosine signal COS(ωt) is equal to 1, 0, 1, 0, respectively, and sine signal SIN(ωt) is equal to 0, 1, 0, 1, respectively. However, periodical resets results in an inconsistent level of signal quality during operation of the iterative quadrature oscillator. Specifically, after a reset the signal quality is very high but before the periodic reset the signal quality may be much lower.

Hence there is a need for a method and system for generating digital quadrature signals with consistently high signal quality.

SUMMARY

Accordingly, the present invention provides a stabilized quadrature oscillator that provides consistently high signal quality by stabilizing the quadrature signals at any iteration whenever signal drift degrades the signal quality. In accordance with the present invention a stabilized quadrature oscillator includes an iterative quadrature oscillator and a quadrature signal stabilizer. The iterative quadrature oscillator is configured to generate an iterative sine signal and an iterative cosine signal. The quadrature signal stabilizer is configured to generate a stabilized sine signal and a stabilized cosine signal based on the iterative sine signal and the iterative cosine signal. Furthermore, the iterative quadrature oscillator uses the stabilized sine signal and the stabilized cosine signal to generate the iterative sine signal and the iterative cosine signal. In addition the stabilized quadrature oscillator includes an energy calculation circuit that is configured to calculate an energy measure of the iterated cosine signal and the iterated sine signal. In a specific embodiment of the present invention the energy measure is equal to the square of the iterated cosine signal plus the square of the iterated sine signal.

The energy measure is used to determine whether the iterated cosine signal and the iterated sine signal are drifting. If the iterated cosine signal and the iterated sine signal are drifting inwards (i.e. the energy measure is less than a low threshold) then the stabilized sine signal is generated to have a greater magnitude than the iterated sine signal and the stabilized cosine signal is generated to have a greater magnitude than the iterated cosine signal. Conversely, if the iterated cosine signal and the iterated sine signal are drifting outwards (i.e. the energy measure is greater than a high threshold) then the stabilized sine signal is generated to have a lesser magnitude than the iterated sine signal and the stabilized cosine signal is generated to have a lesser magnitude than the iterated cosine signal.

The present invention will be more fully understood in view of the following description and drawings.

BRIEF DESCRIPTION OF THE DRAWINGS

FIG. 2A an idealized illustration of the operation of an iterative quadrature oscillator.

FIG. 2C illustrates another common problem of iterative quadrature oscillators.

DETAILED DESCRIPTION

As explained above, iterative quadrature oscillators suffer from a drifting issue that leads to degraded signal quality. However, in accordance with the present invention a quadrature signal stabilizer monitors the iterative quadrature signals and stabilizes the iterative quadrature signals to produce stabilized quadrature signals. The stabilized quadrature signals are used by the iterative quadrature oscillator to generate the next iterative quadrature signals. By using stabilized quadrature signals, the quality of the quadrature signals is preserved throughout the operation of the iterative quadrature oscillator.

Figure 3:
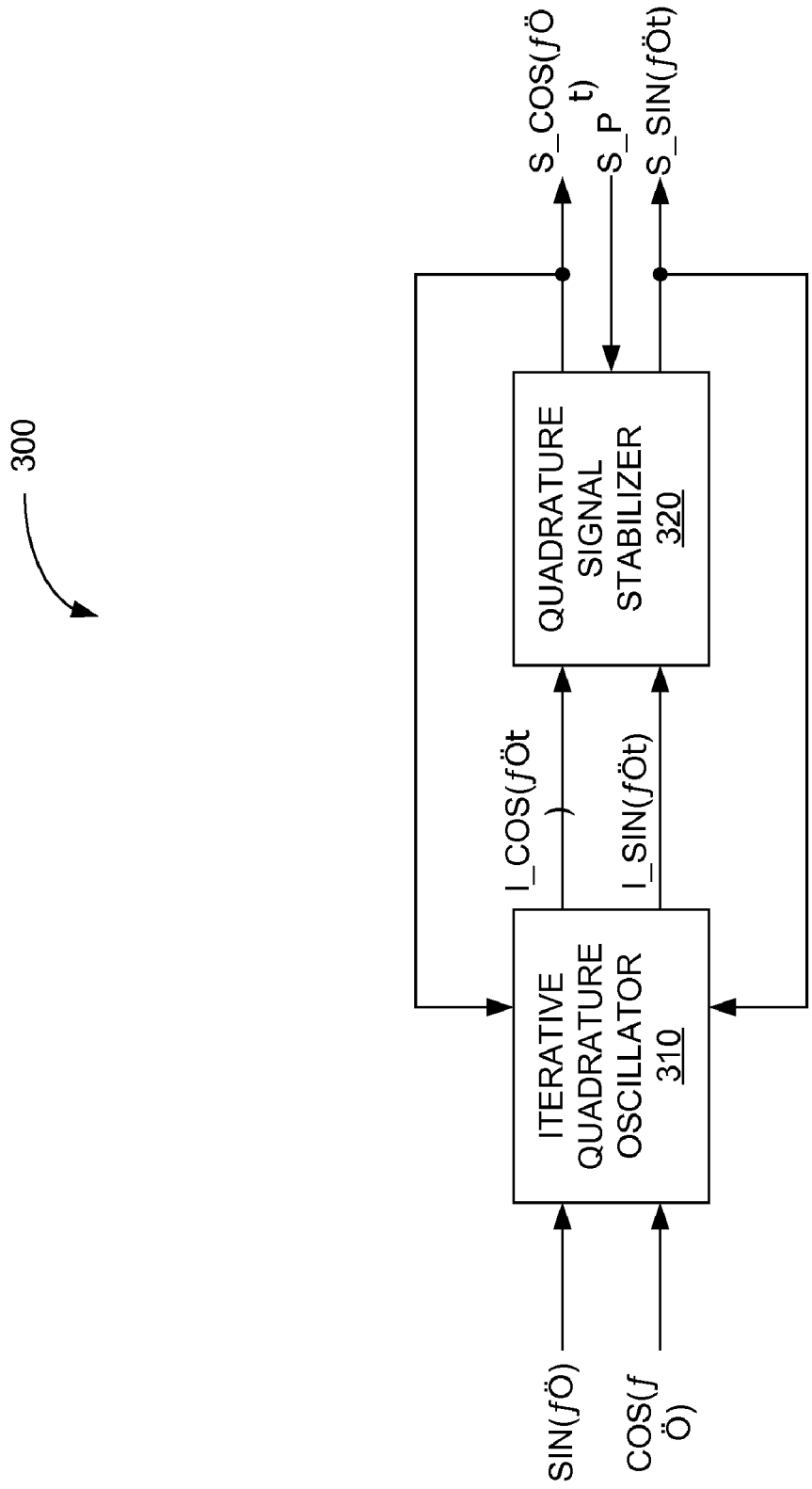
FIG. 3 is block diagram of a stabilized quadrature oscillator in accordance with one embodiment of the present invention.

FIG. 3 shows a block diagram of stabilized quadrature oscillator 300 in accordance with one aspect of the present invention. Stabilized quadrature oscillator 300 includes an iterative quadrature oscillator 310 and a quadrature signal stabilizer 320. Iterative quadrature oscillator 310 receives a sine parameter SIN(ω) and a cosine parameter COS(ω). Iterative quadrature oscillator 310 also receives a stabilized cosine signal S_COS(ωt) and a stabilized sine signal S_SIN(ωt) from quadrature signal stabilizer 320. In one embodiment of the present invention, iterative quadrature oscillator 310 generates an iterative sine signal I_SIN(ωt) and an iterative cosine signal I_COS(ωt) using the rotation method as described above. However, rather than iterating with iterative sine signal I_SIN(ωt) and iterative cosine signal I_COS(ωt), iterative quadrature oscillator 310 uses stabilized sine signal S_SIN(ωt) and stabilized cosine signal S_COS(ωt) to generate iterative sine signal I_SIN(ωt) and iterative cosine signal I_COS(ωt). Thus, in this particular embodiment of the present invention, iterative quadrature oscillator 310 calculates iterative cosine signal I_COS(ωt) as COS(ω) multiplied by stabilized cosine signal S_COS(ω(t−1)) minus the product of SIN(ω) with stabilized sine signal S_SIN(ω(t−1)). This relationship is set out mathematically in equation EQ6. Similarly, iterative sine signal SIN(ωt) is equal to SIN(ω) multiplied by stabilized cosine signal S_COS(ω(t−1)) plus the product of COS(ω) with stabilized sine signal S_SIN(ω(t−1)). This relationship is set out mathematically in equation EQ7. Other embodiments of the present invention may use other types of iterative quadrature oscillators.

$$I\_COS(\omega t)=[COS(\omega)*S\_COS(\omega(t-1))]-[SIN(\omega)*S\_SIN(\omega(t-1))] \quad (EQ6)$$

$$I\_SIN(\omega t)=[SIN(\omega)*S\_COS(\omega(t-1))]+[COS(\omega)*S\_SIN(\omega(t-1))] \quad (EQ7)$$

Quadrature signal stabilizer 320 receives iterative sine signal I_SIN(ωt) and an iterative cosine signal I_COS(ωt) from iterative quadrature oscillator 310. Quadrature signal stabilizer 320 also receives one or more stabilizer parameters S_P, which controls the amount of stabilization provided by quadrature signal stabilizer 320 as described below. Quadrature signal stabilizer produces stabilized sine signal S_SIN(ωt) and stabilized cosine signal S_COS(ωt), as described in more details below.

In general, quadrature signal stabilizer 320 monitors iterative sine signal I_SIN(ωt) and iterative cosine signal I_COS(ωt) to determine when the iterative quadrature signals are drifting inward or drifting outward. When inward drift is detected, stabilized sine signal S_SIN(ωt) is set to a value with a larger magnitude than iterative sine signal I_SIN(ωt) and stabilized cosine signal S_COS(ωt) is set to a value with a larger magnitude than iterative cosine signal I_COS(ωt). Conversely, when outward drift is detected, stabilized sine signal S_SIN(ωt) is set to a value with a smaller magnitude than iterative sine signal I_SIN(ωt) and stabilized cosine signal S_COS(ωt) is set to a value with a smaller magnitude than iterative cosine signal I_COS(ωt).

In one embodiment of the present invention, the energy of the iterative quadrature vector IQ[t] is used to detect inward or outward drift. As used herein, the energy of iterative quadrature vector IQ[t] is equal to the square of iterative sine signal I_SIN(ωt) plus the square of iterative cosine signal I_COS(ωt), which is expressed mathematically in equation EQ8 using E_IQ(t) to represent the energy of iterative quadrature vector IQ(t).

$$E\_IQ(t)=COS^2(\omega(t-1))+SIN^2(\omega(t-1)) \quad (EQ8)$$

Thus, the energy of iterative quadrature vector IQ(t) is equal to the square of the magnitude of iterative quadrature vector IQ(t). As shown in FIG. 2A, the magnitude of iterative quadrature vector IQ[t] should equal one. Therefore the energy of iterative quadrature vector should also be equal to one.

Figure 1:
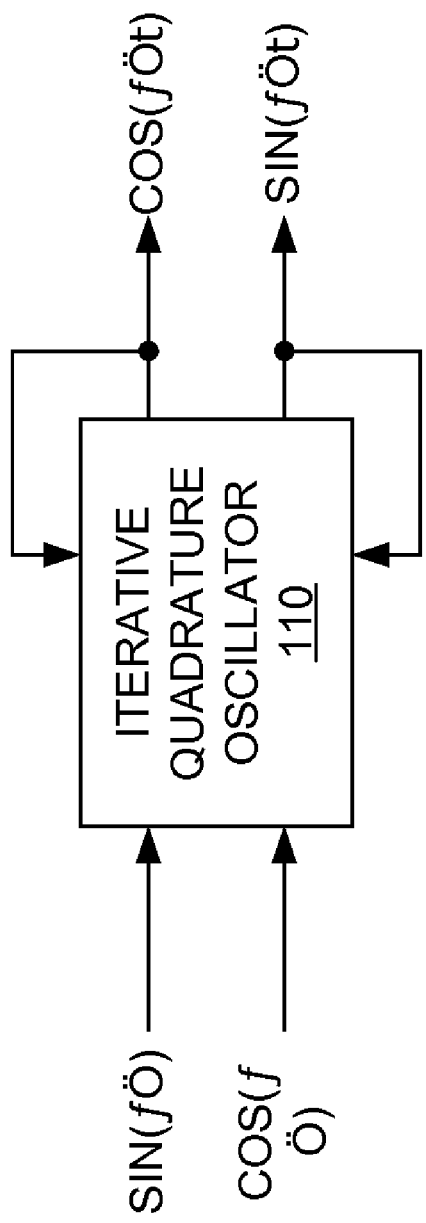
FIG. 1 is a simplified block diagram of an iterative quadrature oscillator.
Figure 2B:
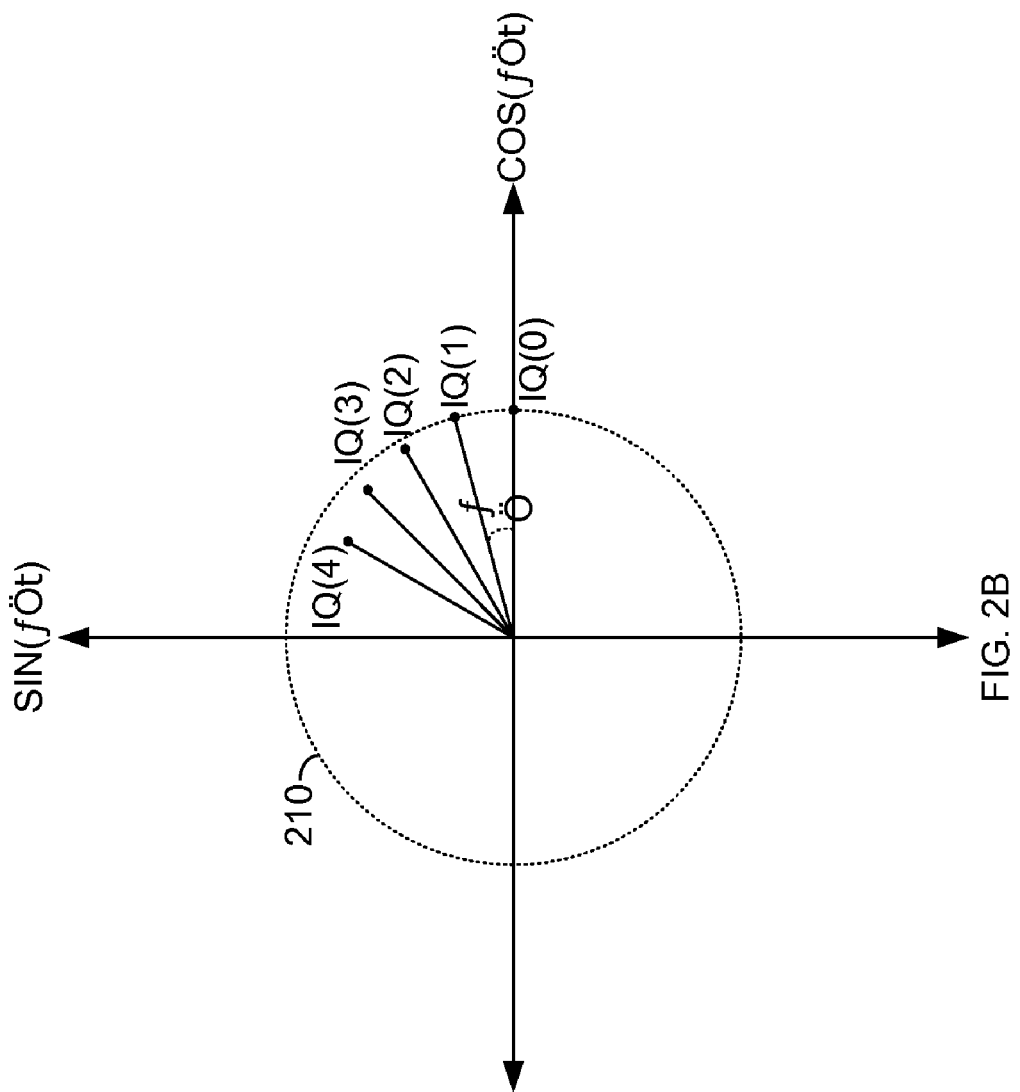
FIG. 2B illustrates a common problem of iterative quadrature oscillators.

As illustrated in FIG. 2A, if iterative sine signal I_SIN(ωt) and iterative cosine signal I_COS(ωt) were completely accurate, then the magnitude and energy of the iterative quadrature vector IQ(t) would equal one. However, as illustrated in FIG. 2B inward drifting of iterative quadrature vector IQ(t) occurs, when the magnitude and energy of the iterative quadrature vector IQ(t) is less than one. Furthermore, as illustrated in FIG. 2C outward drifting of iterative quadrature vector IQ(t) occurs, when the magnitude and energy of the iterative quadrature vector IQ(t) is greater than one.

Figure 4:
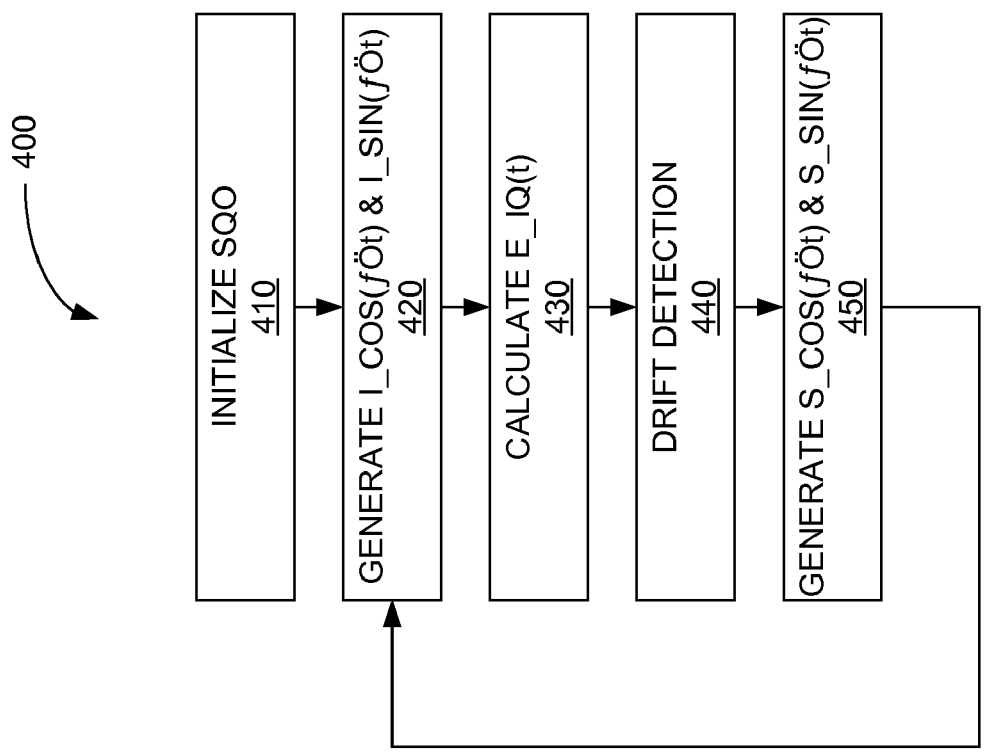
FIG. 4 is a flow diagram for a stabilized quadrature oscillator in accordance with one embodiment of the present invention.

FIG. 4 is a flow diagram 400 that illustrates the operation of stabilized quadrature oscillator 300 in accordance with one embodiment of the present invention. First, in INITIALIZE SQO 410, stabilized quadrature oscillator 300 is initialized.

The initialization of stabilized quadrature oscillator 300 includes setting an initial value for iterative sine signal I_SIN(ωt), iterative cosine signal I_COS(ωt), stabilized sine signal S_SIN(ωt), and stabilized cosine signal S_COS(ωt). Generally, when initialization occurs time t is set equal to zero. Thus at time t=0, iterative sine signal I_SIN(ωt) is set equal to zero, iterative cosine signal I_COS(ωt) is set equal to one, stabilized sine signal S_SIN(ωt) is set equal to zero, and stabilized cosine signal S_COS(ωt) is set equal to one. Furthermore, during initialization, stabilizing parameters S_P are received and may be used to calculate other operating parameters. For example, in some embodiments of the present invention stabilizing parameter S_P is an integer that is used to calculate a low threshold T_L, a high threshold T_H, a low correction C_L, and a high correction C_H. In a specific embodiment of the present invention, low threshold T_L is equal to one minus two raised to the negative stabilizing parameter S_P, high threshold H_L is equal to one plus minus two raised to the negative stabilizing parameter S_P, low correction C_L is equal to one plus two raised to the negative stabilizing parameter minus one, high correction C_H is also equal to one plus two raised to the negative stabilizing parameter minus one. These relationships are shown mathematically with equations EQ9, EQ10, EQ11, EQ12.

$$T\_L=1-2^{-S\_P} \quad (EQ9)$$

$$T\_H=1+2^{-S\_P} \quad (EQ10)$$

$$C\_L=1+2^{(-S\_P-1)} \quad (EQ11)$$

$$C\_H=1-2^{(-S\_P-1)} \quad (EQ12)$$

In other embodiment of the present invention, low correction C_L is equal to one plus two raised to the negative stabilizing parameter and high correction C_H is also equal to one plus two raised to the negative stabilizing parameter. These relationships are shown mathematically in the following equations.

$$C\_L=1+2^{-S\_P}$$

$$C\_H=1-2^{-S\_P}$$

After initialize SQO 410, iterative quadrature oscillator 310 generates iterative sine signal I_SIN(ωt) iterative cosine signal I_COS(ωt) in GENERATE I_COS(ωt) & I_SIN(ωt) 420. For example, in one embodiment of the present invention the method described above using equations EQ6 an EQ7 is used to generate iterative sine signal I_SIN(ωt) iterative cosine signal I_COS(ωt). Then in CALCULATE E_IQ(t) 430, quadrature signal stabilizer 320 calculates the energy of iterative quadrature vector IQ(t) using the method described above and expressed in equation EQ8.

Then, in DRIFT DETECTION 440, quadrature signal stabilizer 320 compares the energy of iterative quadrature vector IQ(t) with low threshold T_L and high threshold T_H. If the energy of iterative quadrature vector IQ(t) is greater than high threshold T_H, an outward drift is present. Conversely, if the energy of iterative quadrature vector IQ(t) is less than low threshold T_L, an inward drift is present. However, if the energy of iterative quadrature vector IQ(t) is greater than or equal to low threshold T_L and less than or equal to high threshold T_H, no significant drift is present.

Then, in GENERATE S_COS(ωt) & S_SIN(ωt) 450, quadrature signal stabilizer 320 generates stabilized cosine signal S_COS(ωt) and stabilized sine signal S_SIN(ωt) based on the results of the comparisons performed in DRIFT DETECTION 440. In accordance with one embodiment of the present invention, when inward drift is detected (i.e. the energy of iterative quadrature vector IQ(t) is less than low threshold T_L), quadrature signal stabilizer 320 sets stabilized cosine signal S_COS(ωt) equal to iterative cosine signal I_COS(ωt) multiplied by low correction C_L and sets stabilized sine signal S_SIN(ωt) equal to iterative sine signal I_SIN(ωt) multiplied by low correction C_L. Conversely, when outward drift is detected (i.e. the energy of iterative quadrature vector IQ(t) is greater than high threshold T_H), quadrature signal stabilizer 320 sets stabilized cosine signal S_COS(ωt) equal to iterative cosine signal I_COS(ωt) multiplied by high correction C_H and sets stabilized sine signal S_SIN(ωt) equal to iterative sine signal I_SIN(ωt) multiplied by high correction C_H. However, when no significant drift is detected (i.e. the energy of iterative quadrature vector IQ(t) is greater than or equal to low threshold T_L and less than or equal to high threshold T_H), quadrature signal stabilizer 320 sets stabilized cosine signal S_COS(ωt) equal to iterative cosine signal I_COS(ωt) and sets stabilized sine signal S_SIN (ωt) equal to iterative sine signal I_SIN(ωt). The calculation for stabilized cosine signal S_COS(ωt) and stabilized sine signal S_SIN(ωt) are expressed mathematically in equations EQ13 and EQ14, respectively.

$$S\_COS(\omega t) = \begin{cases} C\_L * I\_COS(\omega t), & \text{if } E\_IQ(t) < T\_L \\ C\_H * I\_COS(\omega t), & \text{if } E\_IQ(t) > T\_H \\ I\_COS(\omega t), & \text{Otherwise} \end{cases} \quad \text{(EQ13)}$$

$$S\_SIN(\omega t) = \begin{cases} C\_L * I\_SIN(\omega t), & \text{if } E\_IQ(t) < T\_L \\ C\_H * I\_SIN(\omega t), & \text{if } E\_IQ(t) > T\_H \\ I\_SIN(\omega t), & \text{Otherwise} \end{cases} \quad \text{(EQ14)}$$

After generating stabilized cosine signal S_COS(ωt) and stabilized sine signal S_SIN(ωt), the next iteration begins in GENERATE equal to GENERATE I_COS(ωt) & I_SIN(ωt) 420.

Figure 5:
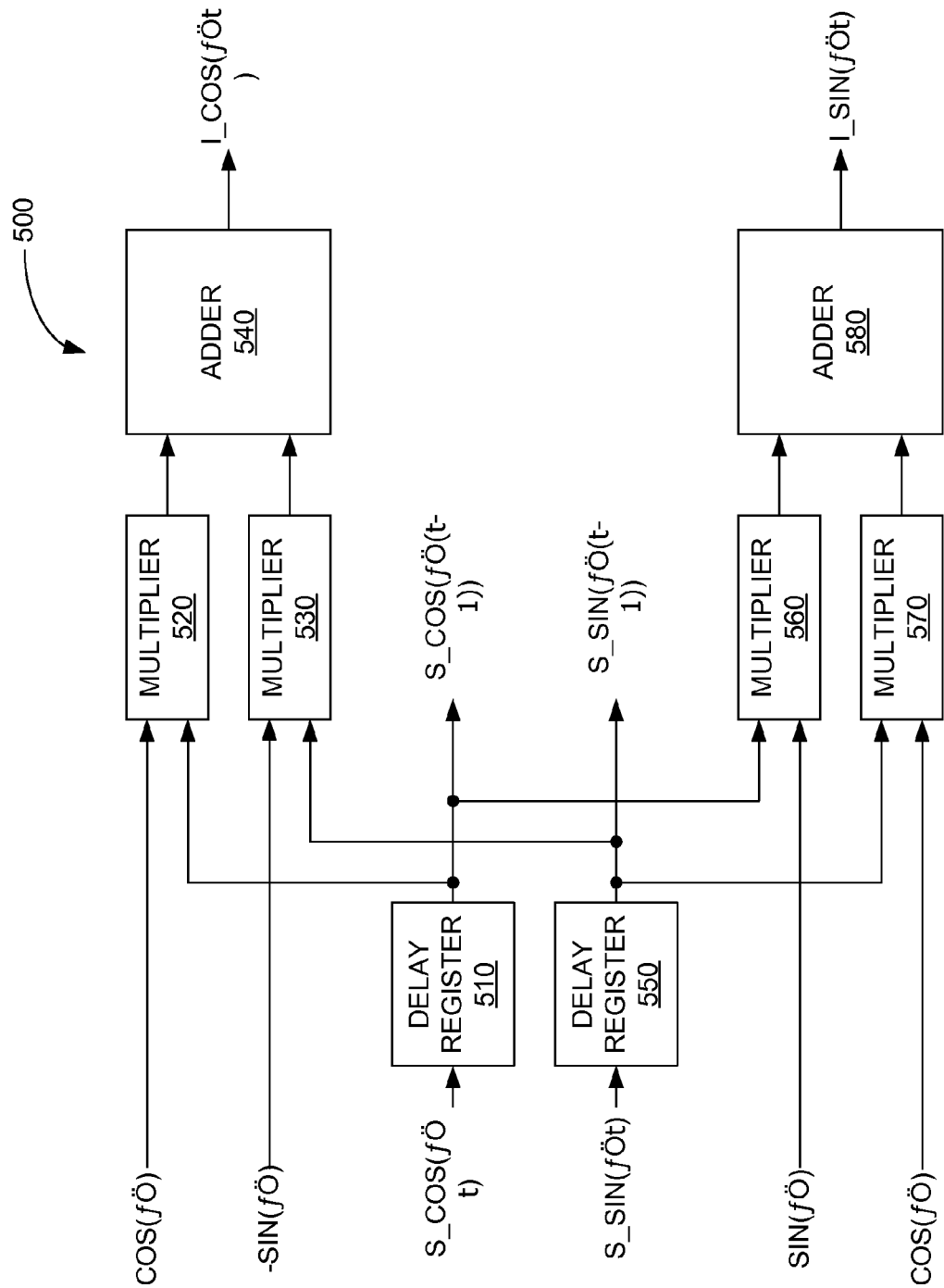
FIG. 5 is block diagram of iterative quadrature oscillator.

FIGS. 5, 6, 7, and 8 provide detailed block diagrams of an implementation of stabilized quadrature oscillator in accordance with one embodiment of the present invention. Specifically, FIG. 5 is a block diagram of an iterative quadrature oscillator 500, which can be used as iterative quadrature oscillator 310 (FIG. 3). Iterative quadrature oscillator 500 includes a delay register 510, a multiplier 520, a multiplier 530, an adder 540, a delay register 550, a multiplier 560, a multiplier 570, and an adder 580. Iterative quadrature oscillator 500 receives sine parameter SIN(ω), cosine parameter COS(ω), stabilized cosine signal S_COS(ωt), and stabilized sine signal S_SIN(ωt) and generates iterative sine signal I_SIN(ωt) and an iterative cosine signal I_COS(ωt) using the rotation method as described above and expressed mathematically in equations EQ6 and EQ7.

Specifically, delay register 510 receives stabilized cosine signal S_COS(ωt) and provides stabilized cosine signal S_COS(ω(t−1)) to multipliers 520 and 560. delay register 550 receives stabilized sine signal S_SIN(ωt) and provides stabilized sine signal S_SIN(ω(t−1)) to multipliers 530 and 570.

Multiplier 520 receives cosine parameter COS(ω) and multiplies cosine parameter COS(ω) with stabilized cosine signal S_COS(ω(t−1)). Multiplier 520 provides the resulting product to adder 540. Multiplier 530 receives negative sine parameter SIN(ω) and multiplies negative sine parameter-SIN(ω) with stabilized sine signal S_SIN(ω(t−1)). Multiplier 530 provides the resulting product to adder 540. Adder 540 adds the products from multiplier 520 and multiplier 530 to produce iterative cosine signal I_COS(ωt).

Similarly, Multiplier 560 receives sine parameter SIN(ω) and multiplies sine parameter SIN(ω) with stabilized cosine signal S_COS(ω(t−1)). Multiplier 560 provides the resulting product to adder 580. Multiplier 570 receives cosine parameter COS(ω) and multiples cosine parameter COS(ω) with stabilized sine signal S_SIN(ω(t−1)). Multiplier 580 provides the resulting product to adder 580. Adder 580 adds the products from multiplier 560 and multiplier 570 to produce iterative sine signal I_SIN(ωt).

In some embodiments of the present invention, only sine parameter SIN(ω) is provided and cosine parameter COS(ω) must be calculated. Well known methods and circuits can be used to calculate COS(ω) from SIN(ω). Specifically, COS(ω) is equal to the square root of one minus the SIN(ω) squared. In other embodiments only cosine parameter COS(ω) is provided and sine parameter SIN(ω) must be calculated using similar techniques.

Figure 6:
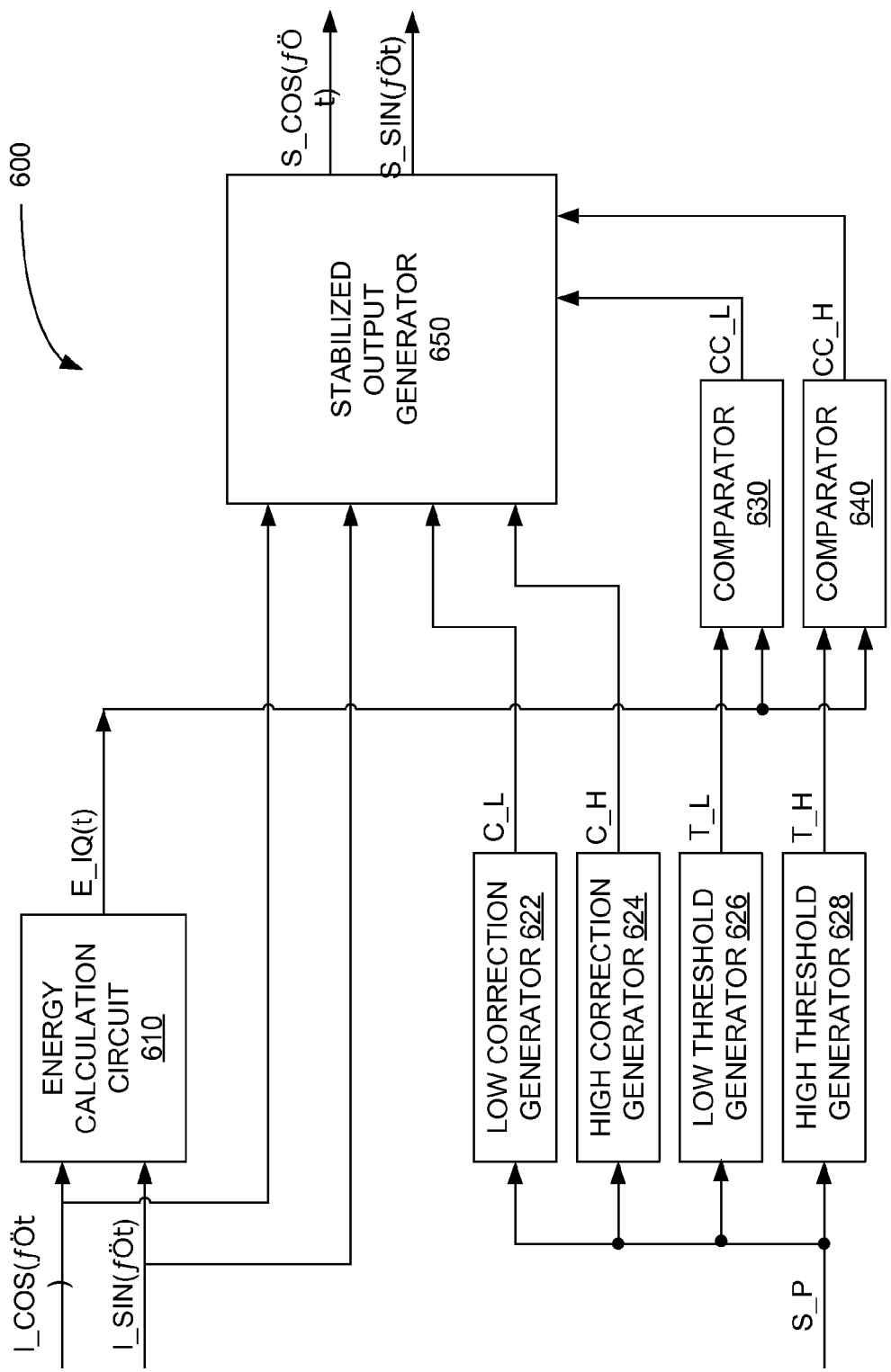
FIG. 6 is a block diagram of a quadrature signal stabilizer in accordance with one aspect of the present invention.

FIG. 6 is a block diagram of a quadrature stabilization circuit 600, which can be used to implement quadrature stabilization circuit 320 (FIG. 3). Quadrature stabilization circuit 600 includes an energy calculation circuit 610, a low correction generator 622, a high correction generator 624, a low threshold generator 626, a high threshold generator 628, a comparator 630, a comparator 640, and a stabilized output generator 650. Quadrature signal stabilizer 600 receives iterative sine signal I_SIN(ωt), iterative cosine signal I_COS(ωt) and one or more stabilizer parameters S_P, which controls the amount of stabilization provided by quadrature signal stabilizer 600. Quadrature signal stabilizer 600 produces stabilized sine signal S_SIN(ωt) and stabilized cosine signal S_COS(ωt).

Specifically, Energy calculation circuit 610, which receives iterative sine signal I_SIN(ωt) and iterative cosine signal I_COS(ωt), calculates the energy of iterative quadrature vector IQ(t) as described above and expressed in equation EQ8 (the energy value is labeled E_IQ(t) in FIG. 6). Energy calculation circuit 610 provides the calculated energy E_IQ(t) to comparators 630 and 640. A detailed block diagram of an embodiment of energy calculation circuit 610 is provided in FIG. 7 and described below.

Low correction generator 622 receives stabilization parameter S_P and generates low correction C_L for stabilized output generator 650. Different embodiments of the present invention may generate low correction C_L differently. However as described above, in one embodiment of the present invention, low correction C_L is calculated using equation EQ11.

High correction generator 624 receives stabilization parameter S_P and generates high correction C_H for stabilized output generator 650. Different embodiments of the present invention may generate high correction H_L differently. However as described above, in one embodiment of the present invention, high correction H_L is calculated using equation EQ12.

Low threshold generator 626 receives stabilization parameter S_P and generates low threshold T_L for comparator 630. Different embodiments of the present invention may generate low threshold T_L differently. However as described above, in one embodiment of the present invention, low threshold T_L is calculated using equation EQ9.

High threshold generator 628 receives stabilization parameter S_P and generates high threshold T_H for comparator 640. Different embodiments of the present invention may generate high threshold T_H differently. However as described above, in one embodiment of the present invention, high threshold T_H is calculated using equation EQ10.

Comparator 630 receives energy E_IQ(t) from energy calculation circuit 610 and low threshold T_L from low threshold generator 626. Comparator 630 generates a low comparison control bit CC_L based on a comparison between energy E_IQ(t) and low threshold T_L. Specifically, when energy E_IQ(t) is less than low threshold T_L, low comparison control bit CC_L is set at a first state (i.e. logic high). However, when energy E_IQ(t) is greater than or equal to low threshold T_L, low comparison control bit CC_L is set at a second state (i.e. logic low). Comparator 630 provides low comparison control bit CC_L to stabilized output generator 650.

Comparator 640 receives energy E_IQ(t) from energy calculation circuit 610 and high threshold T_H from high threshold generator 628. Comparator 640 generates a high comparison control bit CC_H based on a comparison between energy E_IQ(t) and high threshold T_H. Specifically, when energy E_IQ(t) is greater than high threshold T_H, high comparison control bit CC_H is set at a first state (i.e. logic high). However, when energy E_IQ(t) is less than or equal to high threshold T_H, high comparison control bit CC_H is set at a second state (i.e. logic low). Comparator 640 provides high comparison control bit CC_H to stabilized output generator 650.

Stabilized output generator 650 receives iterative cosine signal I_COS($\omega$t), iterative sine signal I_SIN($\omega$t), low correction C_L, high correction C_H, low comparison control bit CC_L, and high comparison control bit CC_H. Stabilized output generator 650 generates stabilized cosine signal S_COS($\omega$t) and stabilize sine signal S_SIN($\omega$t) as described above and expressed in equations EQ13 and EQ14, respectively. A detailed block diagram of one implementation of stabilized output generator 640 is illustrated in FIG. 8 and described below.

Figure 7:
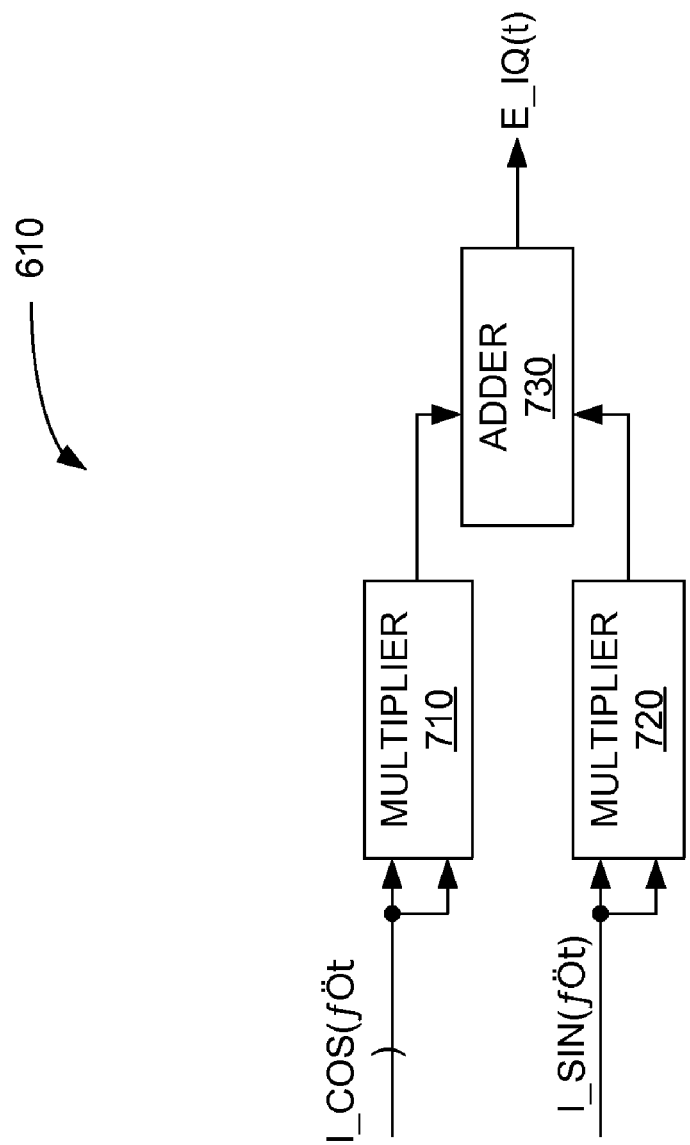
FIG. 7 is a block diagram of an energy calculation circuit in accordance with one aspect of the present invention.

FIG. 7 is a block diagram of energy calculation circuit 610 in accordance with one embodiment of the present invention. Energy calculation circuit 610, which includes a multiplier 710, a multiplier 720, and an adder 740 receives iterative sine signal I_SIN($\omega$t) and iterative cosine signal I_COS($\omega$t) and calculates the energy of iterative quadrature vector IQ(t). Multiplier 710 receives iterative cosine signal I_COS($\omega$t) on both input ports of multiplier 710. Thus, multiplier 710 calculates the square of iterative cosine signal I_COS($\omega$t) and provides the product to adder 730. Similarly, multiplier 720 receives iterative sine signal I_SIN($\omega$t) on both input ports of multiplier 720. Thus, multiplier 720 calculates the square of iterative sine signal I_SIN($\omega$t) and provides the product to adder 730. Adder 730 adds the products from multiplier 710 and 720 to generate energy E_IQ(t), which is the energy of the iterative quadrature vector IQ(t) as described above and expressed in equation EQ8.

Figure 8:
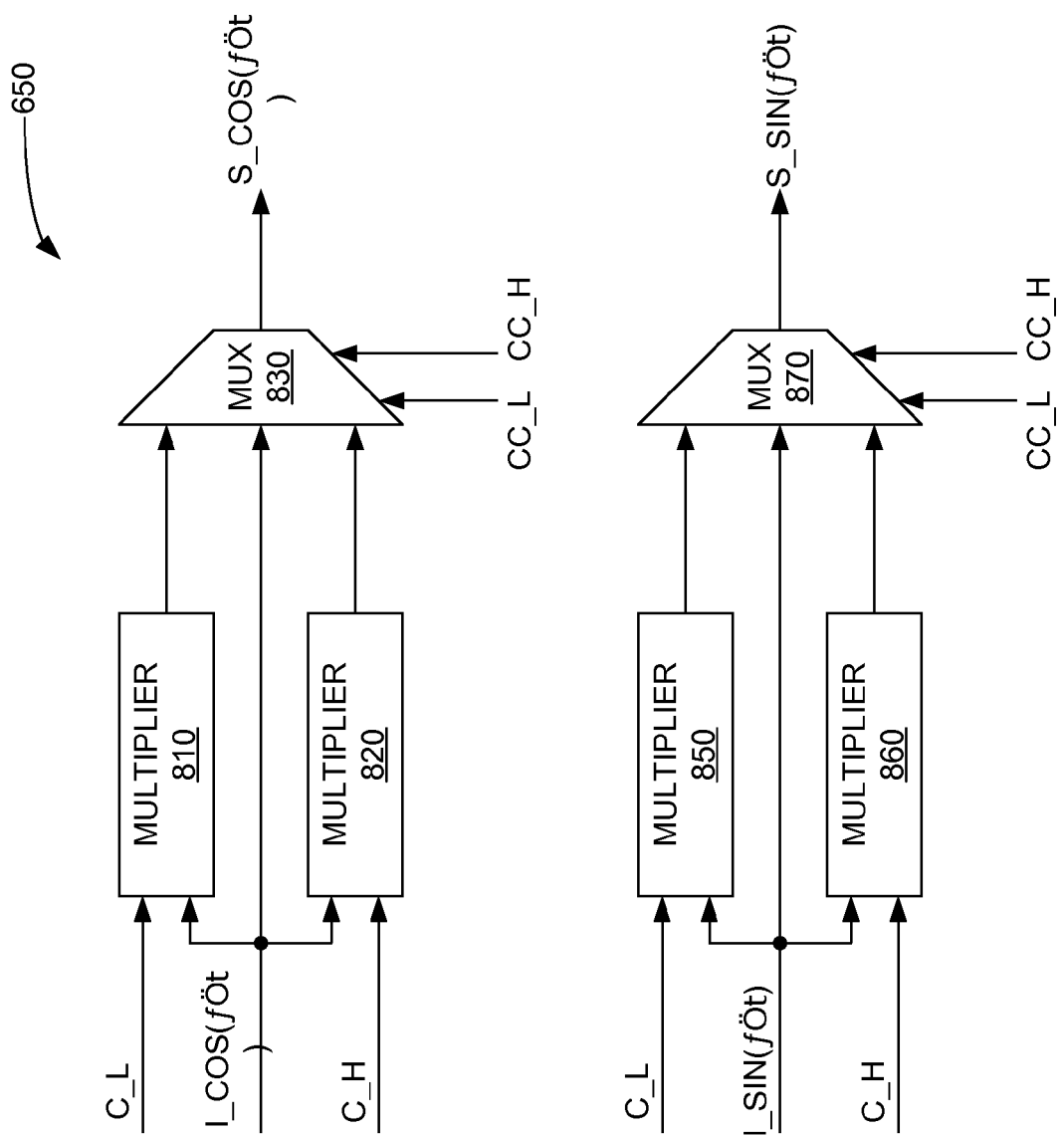
FIG. 8 a block diagram of a stabilized output generator in accordance with one aspect of the present invention.

FIG. 8 is a block diagram of stabilized output generator 650 having a multiplier 810, a multiplier 820, a multiplexer 830 (labeled MUX), a multiplier 850, a multiplier 860, and a multiplexer 870 (labeled MUX), in accordance with one embodiment of the present invention. Stabilized output generator 650 receives iterative cosine signal I_COS($\omega$t), iterative sine signal I_SIN($\omega$t), low correction C_L, high correction C_H, low comparison control bit CC_L, and high comparison control bit CC_H. Stabilized output generator 650 generates stabilized cosine signal S_COS($\omega$t) and stabilize sine signal S_SIN($\omega$t) as described above and expressed in equations EQ13 and EQ14, respectively.

Specifically, multiplier 810, which receives low correction C_L and iterative cosine signal I_COS($\omega$t), multiplies low correction C_L with iterative cosine signal I_COS($\omega$t) and provides the product to a first input port of multiplexer 830. Multiplier 820 which receives high correction C_H and iterative cosine signal I_COS($\omega$t), multiplies high correction C_H with iterative cosine signal I_COS($\omega$t) and provides the product to a second input port of multiplexer 830. Multiplexer 830 receives iterative cosine signal I_COS($\omega$t) on a third input port provides stabilized cosine signal S_COS($\omega$t) on an output port. Multiplexer 830 is controlled by low comparison control bit CC_L and high comparison control bit CC_H. Specifically, when low comparison control bit CC_L is at a first state (i.e. logic high), which indicates that energy E_IQ(t) of iterated quadrature vector IQ(t) is less than low threshold T_L, and high comparison control bit CC_H is in a second state (i.e. logic low), which indicates energy E_IQ(t) of iterated quadrature vector IQ(t) is less than or equal to high threshold H_L, multiplexer 830 outputs iterated cosine signal I_COS($\omega$) multiplied by low correction C_L as stabilized cosine signal S_COS($\omega$t). When low comparison control bit CC_L is at a second state (i.e. logic low), which indicates that energy E_IQ(t) of iterated quadrature vector IQ(t) is greater than or equal to low threshold T_L, and high comparison control bit CC_H is in a first state (i.e. logic high), which indicates energy E_IQ(t) of iterated quadrature vector IQ(t) is greater than high threshold H_L, multiplexer 830 outputs iterated cosine signal I_COS($\omega$) multiplied by high correction C_H as stabilized cosine signal S_COS($\omega$t). When low comparison control bit CC_L is at a second state (i.e. logic low), which indicates that energy E_IQ(t) of iterated quadrature vector IQ(t) is greater than or equal to low threshold T_L, and high comparison control bit CC_H is in a second state (i.e. logic low), which indicates energy E_IQ(t) of iterated quadrature vector IQ(t) is less than or equal to high threshold H_L, then multiplexer 830 outputs iterated cosine signal I_COS($\omega$) as stabilized cosine signal S_COS($\omega$t).

Specifically, multiplier 850, which receives low correction C_L and iterative sine signal I_SIN($\omega$t), multiplies low correction C_L with iterative sine signal I_SIN($\omega$t) and provides the product to a first input port of multiplexer 870. Multiplier 860 which receives high correction C_H and iterative sine signal I_SIN($\omega$t), multiplies high correction C_H with iterative sine signal I_SIN($\omega$t) and provides the product to a second input port of multiplexer 870. Multiplexer 870 receives iterative sine signal I_SIN($\omega$t) on a third input port provides stabilized sine signal S_SIN($\omega$t) on an output port. Multiplexer 870 is controlled by low comparison control bit CC_L and high comparison control bit CC_H. Specifically, when low comparison control bit CC_L is at a first state (i.e. logic high), which indicates that energy E_IQ(t) of iterated quadrature vector IQ(t) is less than low threshold T_L, and high comparison control bit CC_H is in a second state (i.e. logic low), which indicates energy E_IQ(t) of iterated quadrature vector IQ(t) is less than or equal to high threshold H_L, multiplexer 870 outputs iterated sine signal I_SIN($\omega$) multiplied by low correction C_L as stabilized sine signal S_SIN($\omega$t). When low comparison control bit CC_L is at a second state (i.e. logic low), which indicates that energy E_IQ(t) of iterated quadrature vector IQ(t) is greater than or equal to low threshold T_L, and high comparison control bit CC_H is in a first state (i.e. logic high), which indicates energy E_IQ(t) of iterated quadrature vector IQ(t) is greater than high threshold H_L, multiplexer 870 outputs iterated sine signal I_SIN($\omega$) multiplied by high correction C_H as stabilized sine signal S_SIN($\omega$t). When low comparison control bit CC_L is at a second state (i.e. logic low), which indicates that energy E_IQ(t) of iterated quadrature vector IQ(t) is greater than or equal to low threshold T_L, and high comparison control bit CC_H is in a second state (i.e. logic low), which indicates energy E_IQ(t) of iterated quadrature vector IQ(t) is less than or equal to high threshold H_L, then multiplexer 870 outputs iterated cosine signal I_COS($\omega$) as stabilized cosine signal S_COS($\omega$t).

Figure 9:
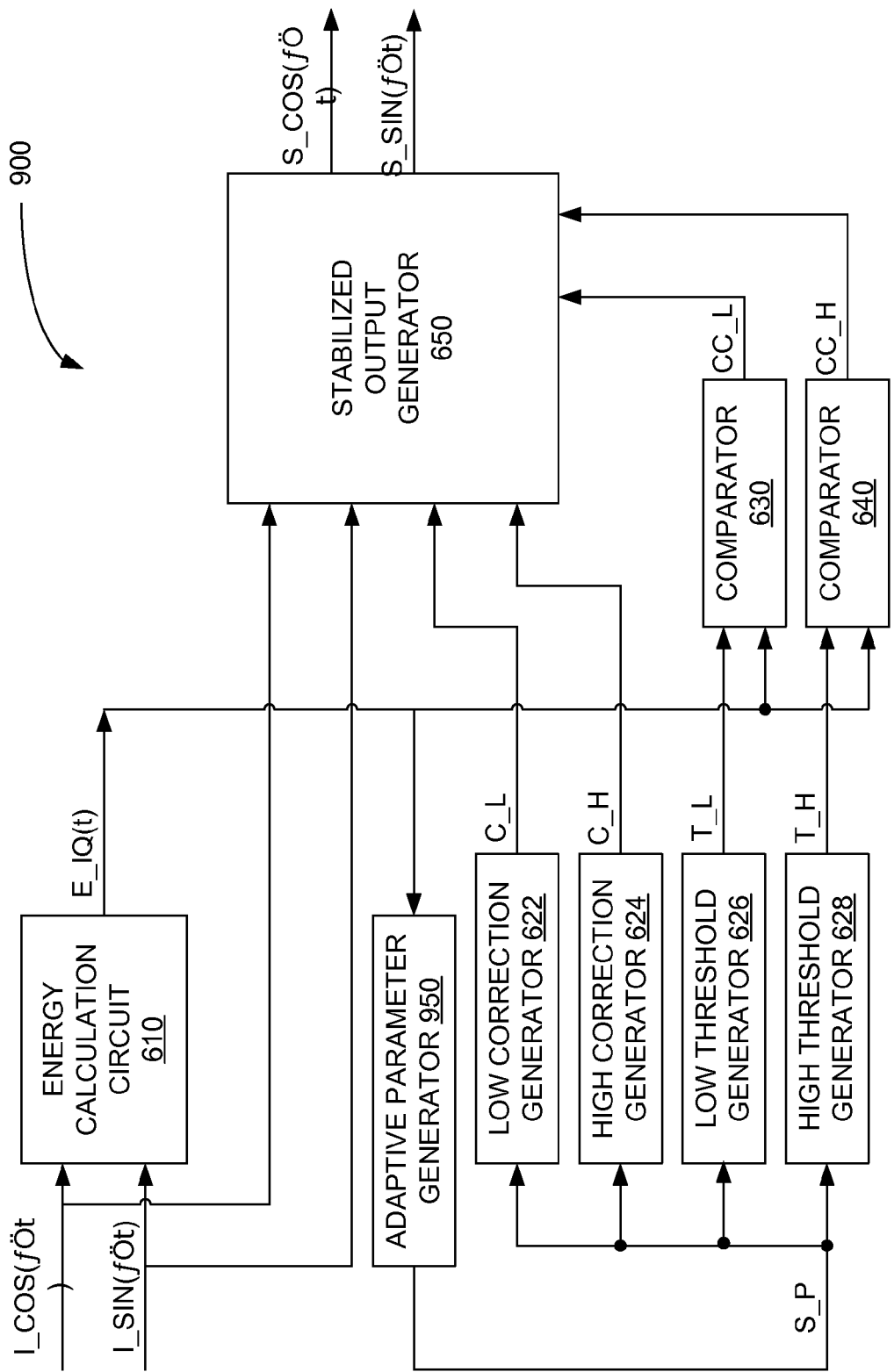
FIG. 9 is a block diagram of a quadrature signal stabilizer in accordance with one aspect of the present invention.

FIG. 9 is a block diagram of a of a quadrature stabilization circuit 900, which can be used to implement quadrature stabilization circuit 320 (FIG. 3), in accordance with some embodiments of the present invention. Because quadrature stabilization circuit 900 is similar to quadrature stabilization circuit 600, the reference numerals of similar or identical circuits and blocks are repeated. Furthermore, for brevity only the differences between quadrature stabilization circuit 600 and quadrature stabilization circuit 900 are described. Quadrature stabilization circuit 900 adaptively calculates stabilization parameter S_P rather than receiving stabilization parameter S_P from an external controller. Therefore, Quadrature stabilization circuit 900 includes an adaptive parameter generator 950, which receives energy E_IQ(t) of iterative quadrature vector IQ(t) and generates one or more stabilization parameter S_P based on energy E_IQ(t) of iterative quadrature vector IQ(t). In other respects, quadrature stabilization circuit 900 functions in the manner described above with respect to quadrature stabilization circuit 600.

As explained above, stabilization parameter S_P is used to calculate thresholds and correction factors. Thus, adaptive parameter generator 950 generates stabilization parameter S_P in the format used by low correction generator 622, high correction generator 624, low threshold generator 626 and high threshold generator 628. In general, if energy E_IQ(t) of iterative quadrature vector IQ(t) is greater than one, then high correction C_H should be decreased as energy E_IQ(t) increases. If energy E_IQ(t) of iterative quadrature vector IQ(t) is less than one, then low correction C_L should be increased as energy E_IQ(t) decreases.

In a particular embodiment of the present invention that is implemented digitally and in which low correction generator 622, high correction generator 624, low threshold generator 626 and high threshold generator 628 are configured as described above with respect to equations EQ9, EQ10, EQ11, and EQ12, adaptive parameter generator 950 generates stabilization parameter as an integer based on bit pattern of energy E_IQ(t). Specifically, energy E_IQ(t) is a binary number in the form (b_0, b_1, b_2, b_3, ... b_x), where each b_x is a single bit representing $2^{(-x)}$. Thus, if energy E_IQ(t) is greater than one, bit b_0 is a 1, but if energy E_IQ(t) is less than one then bit b_0 is a 0. When energy E_IQ(t) is greater than one, stabilization parameter S_P is equal to an integer Y, in which bit b_Y in the binary representation of energy E_IQ (t) is the first "1" bit after bit b_0. For example if energy E_IQ(t) has a 10 bit binary representation 1000100111, which is equivalent to a decimal value of 1.076171875, the first bit that is a "1" after bit b_0 is bit b_4. Thus, stabilization parameter S_P is set to be equal to 4. If energy E_IQ(t) has a 10 bit binary representation 1001110000, which is equivalent to a decimal value of 1.2187, the first bit that is a "1" after bit b_0 is bit b_3. Thus, stabilization parameter S_P is set to be equal to 3.

If energy E_IQ(t) is less than one, stabilization parameter S_P is equal to an integer Z, in which bit b_Z in the binary representation of energy E_IQ(t) is the first "0" bit after bit b_0. For example if energy E_IQ(t) has a 10 bit binary representation 0111101110, which is equivalent to a decimal value of 0.96484375, the first bit that is a "0" after bit b_0 is bit b_5. Thus, stabilization parameter S_P is set to be equal to 5. If energy E_IQ(t) has a 10 bit binary representation 0111001100, which is equivalent to a decimal value of 0.8984375, the first bit that is a "0" after bit b_0 is bit b_4. Thus, stabilization parameter S_P is set to be equal to 4.

In other embodiment of the present invention, adaptive parameter generator 950 generates stabilization parameter as follows. When energy E_IQ(t) is greater than one, stabilization parameter S_P is equal to an integer Y, in which bit b_Y in the binary representation of energy E_IQ(t) is the last "0" bit after bit b_0. For example if energy E_IQ(t) has a 10 bit binary representation 1000100111, which is equivalent to a decimal value of 1.076171875, the last bit that is a "0" after bit b_0 is bit b_3. Thus, stabilization parameter S_P is set to be equal to 3. If energy E_IQ(t) has a 10 bit binary representation 1001110000, which is equivalent to a decimal value of 1.2187, the last bit that is a "0" after bit b_0 is bit b_2. Thus, stabilization parameter S_P is set to be equal to 2.

If energy E_IQ(t) is less than one, stabilization parameter S_P is equal to an integer Z, in which bit b_Z in the binary representation of energy E_IQ(t) is the last "1" bit after bit b_0. For example if energy E_IQ(t) has a 10 bit binary representation 0111101110, which is equivalent to a decimal value of 0.96484375, the last bit that is a "1" after bit b_0 is bit b_4. Thus, stabilization parameter S_P is set to be equal to 4. If energy E_IQ(t) has a 10 bit binary representation 0111001100, which is equivalent to a decimal value of 0.8984375, the last bit that is a "1" after bit b_0 is bit b_3. Thus, stabilization parameter S_P is set to be equal to 3.

Figure 10:
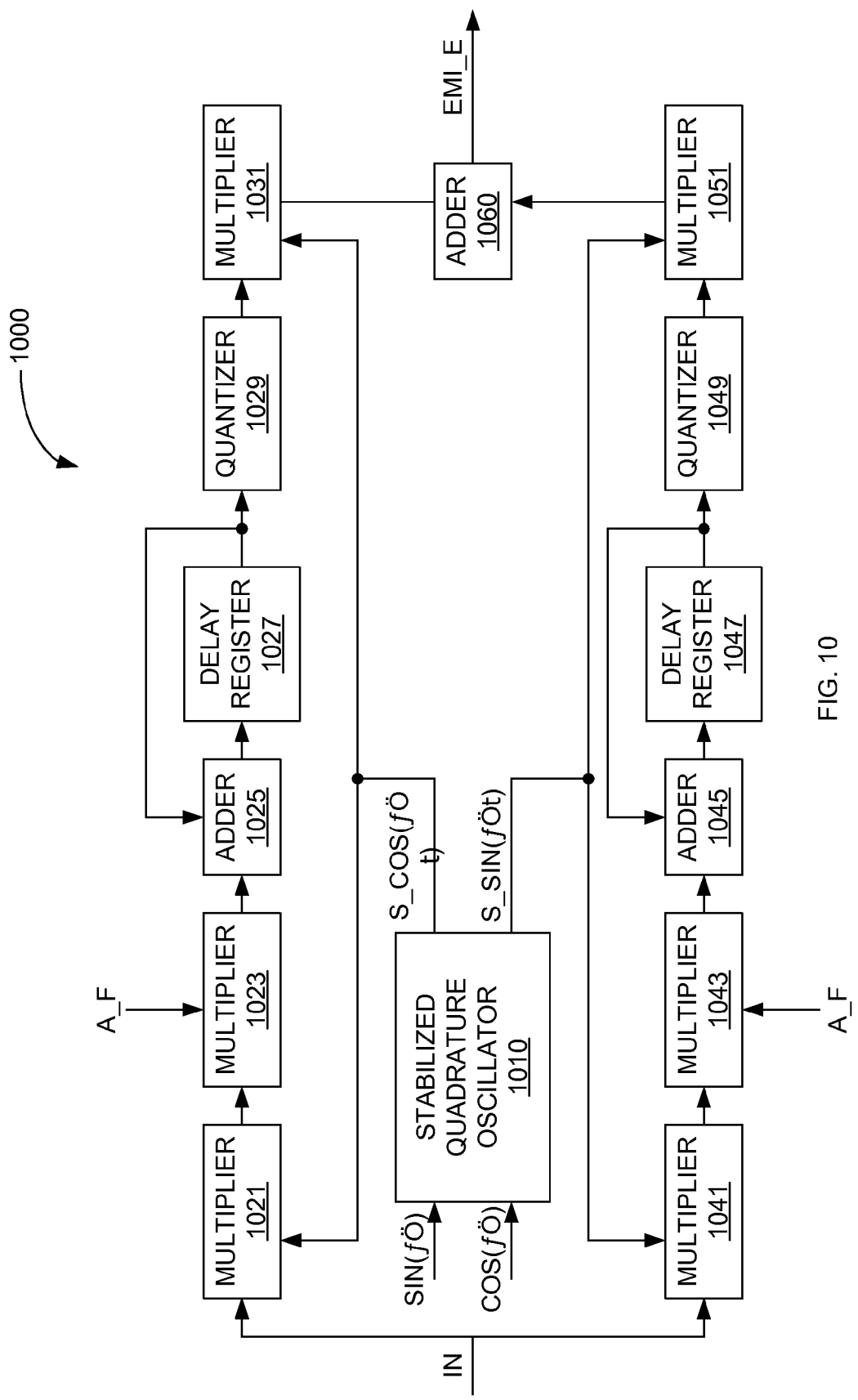
FIG. 10 is a block diagram of a narrow band notch filter that makes use of a stabilized quadrature oscillator to estimate EMI in accordance with one embodiment of the present invention.

As explained above, there are many signal processing applications that make use of quadrature signals. FIG. 10 is a block diagram of a narrow band notch filter 1000 that makes use of a stabilized quadrature oscillator to estimate EMI (Electromagnetic interference) in a signal in accordance with one embodiment of the present invention. Narrow band notch filter 1000, which includes a stabilized quadrature oscillator 1010; multipliers 1021, 1023, 1031, 1041, 1043, and 1051; adders 1025, 1045, and 1060; delay registers 1027 and 1047; and quantizer 1029 and 1049; receives an input signal IN and generates EMI estimate signal EMI_E. Specifically, input signal IN is processed using a pair of quadrature signals to estimate two parts of the EMI. The two parts are then combined to form EMI estimate signal EMI_E.

Input signal IN is coupled to a first input of multiplier 1021 and a first input of multiplier 1031. The second input of multiplier 1021 receives a stabilized cosine signal S_COS (ωt) from stabilized quadrature oscillator 1010. In particular stabilized quadrature oscillator 1010 receives a sine parameter SIN(ω) and a cosine parameter COS(ω) and generates stabilizer produces stabilized sine signal S_SIN(ωt) and a stabilized cosine signal S_COS(ωt), as described above. Multiplier 1021 multiplies incoming signal IN with stabilized cosine signal S_COS(ωt) to translate the cosine portion of the EMI to a DC level. The output of multiplier 1021 is provided to a first input of multiplier 1023. An amplifying factor A_F is provided to the second input of multiplier 1023. Multiplier 1023 multiplies the output from multiplier 1021 with amplifying factor A_F. The output of multiplier 1023 is provided to a first input of adder 1025. Adder 1025 and delay register 1027 form an accumulator that estimates the EMI. Specifically, output of delay register 1027 is provided to the second input of adder 1025. The output of adder 1025 is provided as the input to delay register 1027. The output of delay register 1027 is also provided to the input of quantizer 1029 which quantizes the value from delay register 1027. The output of quantizer 1029 is provided to a first input of multiplier 1031, which also receives stabilized cosine signal S_COS(ωt) from stabilized quadrature oscillator 1010. Multiplier 1031 multiples the output from quantizer 1029 with stabilized cosine signal S_COS(ωt) which translates the cosine portion of the EMI back to an AC signal. The output of multiplier 1031 is provided to a first input of adder 1060.

Input signal IN is also coupled to a first input of multiplier 1041. The second input of multiplier 1041 receives a stabilized sine signal S_SIN(ωt) from stabilized quadrature oscillator 1010. Multiplier 1041 multiplies incoming signal IN with stabilized sine signal S_SIN(ωt) to translate the cosine portion of the EMI to a DC level. The output of multiplier 1041 is provided to a first input of multiplier 1043. Amplifying factor A_F is provided to the second input of multiplier 1043. Multiplier 1043 multiplies the output from multiplier 1041 with amplifying factor A_F. The output of multiplier 1043 is provided to a first input of adder 1045. Adder 1045 and delay register 1047 form an accumulator that estimates the EMI. Specifically, output of delay register 1047 is provided to the second input of adder 1045. The output of adder 1045 is provided as the input to delay register 1047. The output of delay register 1047 is also provided to the input of quantizer 1049 which quantizes the value from delay register 1047. The output of quantizer 1049 is provided to a first input of multiplier 1051, which also receives stabilized sine signal S_SIN(ωt) from stabilized quadrature oscillator 1010. Multiplier 1051 multiples the output from quantizer 1049 with stabilized sine signal S_SIN(ωt) which translates the sine portion of the EMI back to an AC signal. The output of multiplier 1051 is provided to a first input of adder 1060. Adder 1060 adds the sine portion of EMI with the cosine portion of the EMI to form estimated EMI signal EMI_E. Estimated EMI signal EMI_E can be subtracted from input signal IN to remove the EMI.

In the various embodiments of the present invention, novel methods and systems have been described for generating stabilized quadrature signals. By providing stabilization of the quadrature signals, the signal quality of the quadrature signals is greatly increased and consistent. The various embodiments of the structures and methods of this invention that are described above are illustrative only of the principles of this invention and are not intended to limit the scope of the invention to the particular embodiments described. For example, in view of this disclosure those skilled in the art can define other stabilized quadrature oscillators, iterative quadrature oscillators, quadrature signal stabilizers, energy calculation circuits, thresholds, correction factors, stabilized output generators, energy measures, stabilization parameters, rotation matrices, and so forth, and use these alternative features to create a method, or system according to the principles of this invention. Thus, the invention is limited only by the following claims.

What is claimed is:

1. A stabilized quadrature oscillator for generating a stabilized sine signal and a stabilized cosine signal, the stabilized quadrature oscillator comprising:
   an iterative quadrature oscillator configured to generate an iterative sine signal and an iterative cosine signal;
   an energy calculation circuit configured to calculate an energy measure of the iterated cosine signal and the iterated sine signal; and
   a quadrature signal stabilizer configured to generate the stabilized sine signal using the iterative sine signal and to generate the stabilized cosine signal using the iterative cosine signal;
   wherein the iterative quadrature oscillator is configured to generate the iterative sine signal using the stabilized sine signal and the stabilized cosine signal and to generate the iterative cosine signal using the stabilized sine signal and the stabilized cosine signal.

2. The stabilized quadrature oscillator of claim 1, wherein the energy measure is equal to the square of the iterated cosine signal plus the square of the iterated sine signal.

3. The stabilized quadrature oscillator of claim 1, wherein the quadrature signal stabilizer generates the stabilized cosine signal so that a magnitude of the stabilized cosine signal is greater than a magnitude of the iterative cosine signal when the energy measure is less than a low threshold.

4. The stabilized quadrature oscillator of claim 1, wherein the quadrature signal stabilizer generates the stabilized sine signal so that a magnitude of the stabilized sine signal is greater a magnitude of the iterative sine signal when the energy measure is less than the low threshold.

5. The stabilized quadrature oscillator of claim 1, wherein the quadrature signal stabilizer generates the stabilized cosine signal so that a magnitude of the stabilized cosine signal is less than the magnitude of the iterative cosine signal when the energy measure is greater than a high threshold.

6. The stabilized quadrature oscillator of claim 1, wherein the quadrature signal stabilizer generates the stabilized sine signal so that a magnitude of the stabilized sine signal is less than a magnitude of the iterative sine signal when the energy measure is greater than the high threshold.

7. The stabilized quadrature oscillator of claim 1, wherein the quadrature stabilizer generates the stabilized cosine signal by multiplying the iterative cosine signal by a low correction when the energy measure is less than a low threshold; wherein the low correction is greater than one.

8. The stabilized quadrature oscillator of claim 1, wherein the quadrature stabilizer generates the stabilized sine signal by multiplying the iterative sine signal by a low correction when the energy measure is less than a low threshold; wherein the low correction is greater than one.

9. The stabilized quadrature oscillator of claim 1, wherein the quadrature stabilizer generates the stabilized cosine signal by multiplying the iterative cosine signal by a high correction when the energy measure is greater than a high threshold; wherein the high correction is less than one.

10. The stabilized quadrature oscillator of claim 1, wherein the quadrature stabilizer generates the stabilized sine signal by multiplying the iterative sine signal by a high correction when the energy measure is greater than a high threshold; wherein the high correction is less than one.

11. The stabilized quadrature oscillator of claim 1, wherein the quadrature stabilizer receives a stabilizer parameter and calculates a low threshold, a high threshold, a low correction, and a high correction with the stabilizer parameter.

12. The stabilized quadrature oscillator of claim 11,
   wherein the low threshold is equal to one minus two raised to the negative power of the stabilizer parameter, and
   wherein the high threshold is equal to one plus two raised to the negative power of the stabilizer parameter.

13. The stabilized quadrature oscillator of claim 11,
   wherein the low correction is equal to one plus two raised to the negative power of the sum of the stabilizer parameter and one; and
   wherein the high correction is equal to one minus two raised to the negative power of the sum of the stabilizer parameter and one.

14. The stabilized quadrature oscillator of claim 11,
   wherein the low correction is equal to one plus two raised to the negative power of the stabilizer parameter; and
   wherein the high correction is equal to one minus two raised to the negative power of the stabilizer parameter.

15. The stabilized quadrature oscillator of claim 1, further comprising an adaptive parameter generator configured to calculate a stabilizer parameter based on the energy measure.

16. The stabilized quadrature oscillator of claim 15,
   wherein the energy measure is represented as a binary number having a plurality of ordered bits (b_0, b_1, b_2, b_3, . . . b_x), where each b_y is a single bit representing two to the negative x power;
   wherein the stabilizer parameter is set equal to z, where bit b_z is the first bit after b_0 equal to one when bit b_0 is equal to one; and
   wherein the stabilizer parameter is set equal to k, where bit b_k is the first bit after b_0 equal to zero when bit b_0 is equal to one.

17. The stabilized quadrature oscillator of claim 15,
   wherein the energy measure is represented as a binary number having a plurality of ordered bits (b_0, b_1, b_2, b_3, . . . b_x), where each b_y is a single bit representing two to the negative x power;

wherein the stabilizer parameter is set equal to z, where bit b_z is the last bit after b__0 equal to zero when bit b__0 is equal to one; and wherein the stabilizer parameter is set equal to k, where bit b_k is the last bit after b__0 equal to one when bit b__0 is equal to one.

18. A method to generate a stabilized cosine signal and a stabilized sine signal having a quadrature relationship, the method comprising:
   generating an iterative cosine signal an iterative sine signal using the stabilized cosine signal and the stabilized sine signal;
   calculating an energy measure;
   detecting drifting of the iterative cosine signal and the iterative sine signal; and
   generating the stabilized cosine signal and the stabilized sine signal to compensate for drifting of the iterative cosine signal and the iterative cosine signal.

19. The method of claim 18, wherein the energy measure is equal to the square of the iterated cosine signal plus the square of the iterated sine signal.

20. The method of claim 19, wherein the detecting drifting of the iterative cosine signal and the iterative sine signal further comprises:
   detecting inward drift when the energy measure is less than one; and
   detecting outward drift when the energy measure is greater than one.

21. The method of claim 19, wherein generating the stabilized cosine signal and the stabilized sine signal to compensate for drifting of the iterative cosine signal and the iterative cosine signal further comprises:
   generating the stabilized cosine signal to have a greater magnitude than the iterative cosine signal when the energy measure is less than a low threshold; and
   generating the stabilized sine signal to have a greater magnitude than the iterative sine signal when the energy measure is less than the low threshold.

22. The method of claim 19, wherein generating the stabilized cosine signal and the stabilized sine signal to compensate for drifting of the iterative cosine signal and the iterative cosine signal further comprises:
   generating the stabilized cosine signal to have a lesser magnitude than the iterative cosine signal when the energy measure is greater than a high threshold; and
   generating the stabilized sine signal to have a lesser magnitude than the iterative sine signal when the energy measure is greater than the high threshold.

23. The method of claim 18, further comprising:
   calculating a low threshold from a stabilizer parameter;
   calculating a high threshold form the stabilizer parameter;
   calculating a low correction from the stabilizer parameter; and
   calculating a high correction from the stabilizer parameter.

24. The method of claim 23, further comprising calculating the stabilizer parameter based on the energy measure.

* * * * *